Patented Apr. 22, 1930

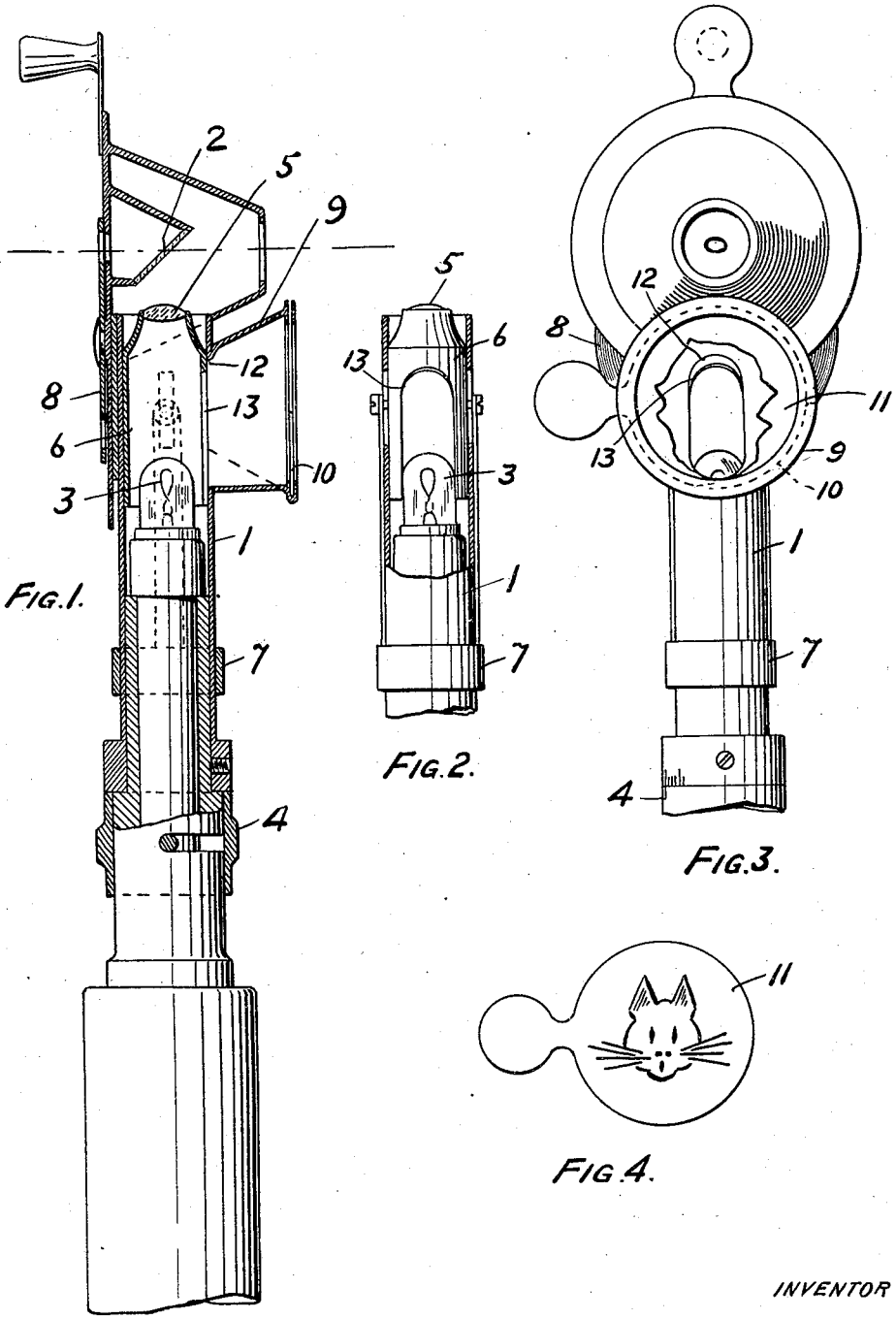

1,755,705

UNITED STATES PATENT OFFICE

JAMES E. REID, OF MOORESTOWN, NEW JERSEY

DIAGNOSTIC OPTICAL INSTRUMENT

Application filed June 4, 1928. Serial No. 282,641.

The present invention relates to improvements in diagnostic optical instruments of which ophthalmoscopes and retinoscopes are examples.

The principal object of the present invention is to provide for diverting the attention of a patient causing him to look steadily in the same direction thereby facilitating the use of the instrument in making the diagnosis.

To these and other ends hereinafter set forth the invention, generally stated, comprises a lantern structure projecting from the wall of the stem of the instrument and adapted for the detachable reception of a transparency along with appropriate windows or openings in the wall of the stem structure operatively arranged in respect to the lamp of the instrument so that an illuminated transparency is presented to the view of the patient and serves to attract his attention and thus keep his eye steady.

The invention also comprises the improvements to be presently described and finally claimed.

In the accompanying drawing to which reference will be made

Figure 1 is a side view principally in central section illustrating an instrument embodying features of the invention.

Fig. 2 is a similar view taken at right angles to Fig. 1 and illustrating a part of the instrument.

Fig. 3 is a front view of the instrument with a part broken away, and

Fig. 4 illustrates a detachable transparency which happens to be adapted for use with children.

In the drawing 1 is the hollow tubular stem of the instrument which happens to be a combined ophthalmoscope and retinoscope. At the upper part of the stem there is a reflector 2. 3 is a lamp mounted in the stem and it can be rotated by means of the collar 4 as is usual in retinoscopes. 5 is a lens and it is mounted in a tubular lens carrier 6 slidably mounted in the stem. 7 is a collar by means of which the lens can be moved to focus the light. The lens is arranged below the reflector and above the light. 8 is a turnably mounted lens holder by means of which different lenses can be brought into the line of vision of the operator which is indicated by the broken line in Fig. 1. There is nothing particularly new about the instrument so far described.

9 is a flaring lantern structure projecting from the wall of the stem in the direction of reflection from the reflector, and it is, by means of the flange 10, adapted for the detachable reception of a transparency 11. There is a window or opening 12 in the stem and also a window or opening 13 in the lens carrier, which assumes the form of an open ended slot, and these openings are arranged opposite to and extend above the lamp so that light from it shines upon and illuminates the transparency 11. To better illuminate the transparency the bottom portion of the wall of the lantern bulges from its normal flaring form which is indicated by the dotted line in Fig. 1.

In use the operator is provided with a number of transparencies which he shows one after another to the patient and by attracting the attention of the patient to the transparencies is able to cause the patient to hold his eye steadily during diagnosis.

It will be obvious to those skilled in the art to which the invention appertains that modifications may be made in details of construction and arrangement and matters of mere form without departing from the spirit of the invention which is not limited to such matters or otherwise than the prior art and the appended claims may require.

I claim:

1. In an optical diagnostic instrument a hollow tubular stem, a reflector at the upper part of the stem, a lamp mounted in the stem, a lens and tubular lens carrier slidably mounted in the stem below the reflector and above the lamp, a flaring lantern structure projecting from the wall of the stem in the direction of reflection from the reflector and adapted for the reception of a transparency, and windows in the wall of the stem and in the wall of the carrier arranged opposite and extending above the lamp and aligned with said flaring lantern structure.

2. An optical diagnostic instrument having a stem, a reflector at the upper part of the stem, a lamp in the stem, a lens and a tubular lens carrier, a lantern structure projecting from and forming part of the wall of the stem and arranged at the front of the instrument to receive light from the lamp, and a transparency arranged at the end of the lantern structure.

3. An optical diagnostic instrument having a stem, a reflector at the upper part of the stem, a lamp in the stem, a lens and a tubular lens carrier, a flaring lantern structure projecting from and forming part of the wall of the stem and having a bulged wall at the lower part thereof and arranged to receive light from the lamp, transparencies, and means on the lantern structure for detachably receiving the transparencies.

JAMES E. REID.